United States Patent
Suzuki

(10) Patent No.: US 10,260,578 B2
(45) Date of Patent: Apr. 16, 2019

(54) PARKING BRAKE UNIT

(71) Applicant: KYB Corporation, Tokyo (JP)

(72) Inventor: Tsutomu Suzuki, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/503,235

(22) PCT Filed: Jul. 22, 2015

(86) PCT No.: PCT/JP2015/070772
§ 371 (c)(1),
(2) Date: Feb. 10, 2017

(87) PCT Pub. No.: WO2016/027609
PCT Pub. Date: Feb. 25, 2016

(65) Prior Publication Data
US 2017/0234377 A1    Aug. 17, 2017

(30) Foreign Application Priority Data
Aug. 18, 2014    (JP) .................................. 2014-166044

(51) Int. Cl.
*F16D 55/224*    (2006.01)
*B61H 5/00*    (2006.01)
(Continued)

(52) U.S. Cl.
CPC .......... *F16D 55/2245* (2013.01); *B60T 13/22* (2013.01); *B61H 5/00* (2013.01);
(Continued)

(58) Field of Classification Search
CPC .. F16D 55/2245; F16D 65/28; F16D 2121/04; F16D 2125/64; F16D 2125/582; B61H 5/00; B60T 13/22
See application file for complete search history.

(56) References Cited

U.S. PATENT DOCUMENTS 3,489,022 A * 1/1970 Krahl ...................... B61H 5/00
188/59
4,018,140 A * 4/1977 Engle ...................... B61H 5/00
188/170
(Continued)

FOREIGN PATENT DOCUMENTS

EP    2037146 A2    3/2009
JP    2003-194117 A    7/2003
(Continued)

*Primary Examiner* — Xuan Lan Nguyen
(74) *Attorney, Agent, or Firm* — Rabin & Berdo, P.C.

(57) ABSTRACT

A parking brake unit of a brake device for braking a wheel includes a first piston having a first engaging part on an inner circumference thereof, the first piston being configured to move in first direction by pressure of the hydraulic fluid supplied to a pressure chamber defined in the back thereof, a first biasing member configured to bias the first piston in second direction, opposite to the first direction, a second piston slidably provided on the inner circumference of the first piston, the second piston having a second engaging part on an outer circumference thereof, and an engaging member configured to cause the first engaging part and the second engaging part to engage with each other, in which the second piston causes a brake lining to move in direction bringing the wheel to be in a braking state, when the first piston moves in the second direction.

9 Claims, 11 Drawing Sheets

(51) Int. Cl.
*B60T 13/22* (2006.01)
*F16D 65/28* (2006.01)
*F16D 121/04* (2012.01)
*F16D 125/58* (2012.01)
*F16D 125/64* (2012.01)

(52) U.S. Cl.
CPC .......... *F16D 65/28* (2013.01); *F16D 2121/04* (2013.01); *F16D 2125/582* (2013.01); *F16D 2125/64* (2013.01)

(56) References Cited

U.S. PATENT DOCUMENTS

| | | | | |
|---|---|---|---|---|
| 5,253,736 | A | * | 10/1993 | Kohler ................ B60T 17/081 188/170 |
| 5,286,095 | A | | 2/1994 | Sell et al. |
| 5,813,499 | A | * | 9/1998 | Staltmeir ................ B61H 5/00 188/59 |
| 6,722,477 | B1 | * | 4/2004 | Wolfsteiner ............ B61H 5/00 188/173 |
| 2010/0044165 | A1 | * | 2/2010 | Argirovski .......... F16D 55/2245 188/71.8 |
| 2010/0294601 | A1 | * | 11/2010 | Kraus ................ B60T 17/083 188/72.2 |

FOREIGN PATENT DOCUMENTS

| | | |
|---|---|---|
| JP | 2009-085429 A | 4/2009 |
| JP | 2009-162243 A | 7/2009 |
| WO | WO-2012/53510 A1 | 4/2012 |

* cited by examiner

PARKING BRAKE UNIT

TECHNICAL FIELD

The present invention relates to a parking brake unit of a brake device.

BACKGROUND ART

Brake devices for braking vehicles, such as railway vehicles, by using fluid pressure such as hydraulic pressure, pneumatic pressure, and the like, have been used conventionally. JP2009-162243A discloses a caliper brake device that brakes rotation of a wheel by friction force between a disk and a pair of brake shoes, by clamping the disk, rotating with the wheel, by the pair of brake shoes. With this caliper brake device, sliding of a pressing piston, relative to a cylinder, is made by compressed air guided to a pressure chamber, so as to press the brake shoes against the disk.

SUMMARY OF INVENTION

However, the caliper brake device according to JP2009-162243A is a positive brake that is brought into a braking state when the compressed air is guided to the pressure chamber. In order to use this caliper brake device as a parking brake during parking, such a state needs to be maintained that the compressed air is kept in the pressure chamber. For this reason, this caliper brake device is not suited to be used as the parking brake.

It is an object of the present invention to provide a parking brake unit that is applicable to positive brakes.

According to one aspect of this invention, a parking brake unit of a brake device for braking a wheel as an output member of an actuator presses a brake lining against a brake disk rotating with the wheel by supply of hydraulic fluid, the parking brake unit includes a first piston formed in a cylindrical shape, the first piston having a first engaging part on an inner circumference thereof, the first piston being configured to move in first direction by pressure of the hydraulic fluid supplied to a pressure chamber defined in the back thereof; a first biasing member configured to bias the first piston in second direction, opposite to the first direction; a second piston slidably provided on the inner circumference of the first piston, the second piston having a second engaging part on an outer circumference thereof; and an engaging member configured to cause the first engaging part and the second engaging part to engage with each other. The second piston causes the brake lining to move in direction bringing the wheel to be in a braking state, when the first piston moves in the second direction.

DESCRIPTION OF EMBODIMENTS

Figure 1:
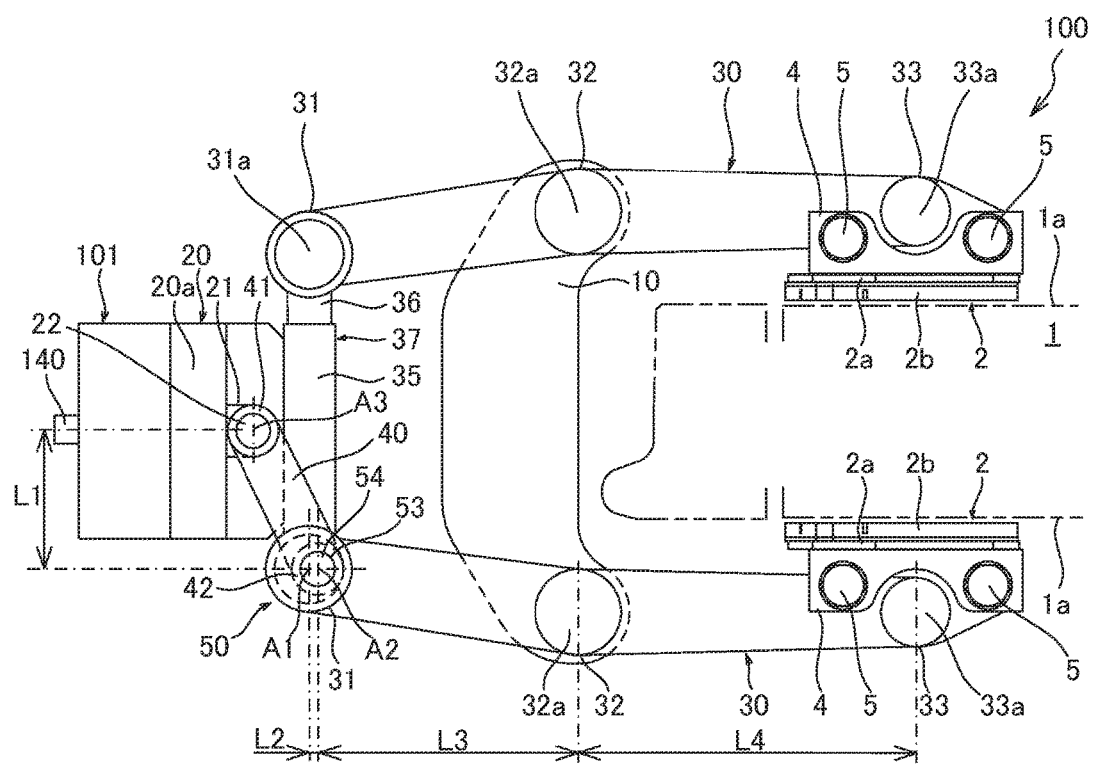
FIG. 1 is a plan view of a brake device to which a parking brake unit according to a first embodiment of the present invention is applied.

Hereinafter, embodiments of the present invention will be explained with reference to the drawings.

First Embodiment

Hereinafter, a parking brake unit 101 according to a first embodiment of the present invention will be explained with reference to FIGS. 1 to 5.

First, the entire structure of a brake device 100, to which the parking brake unit 101 is applied, will be explained with reference to FIGS. 1 and 2.

The brake device 100 is mainly applied to railway vehicles. The brake device 100 brakes a wheel 1 by clamping a brake disk 1a that rotates together with the wheel 1. Specifically, the brake device 100 clamps the brake disk 1a from both sides by a pair of brake linings 2, and brakes rotation of the wheel 1 by friction force between the brake disk 1a and the brake linings 2.

The brake disk 1a is formed on both the front and back surfaces of the wheel 1, and rotates together with the wheel 1. Instead of forming the brake disk 1a and the wheel 1 integrally, it is possible to provide a separate brake disk 1a that rotates together with the wheel 1.

During non-braking, the brake linings 2 are opposed to the brake disk 1a with predetermined space therebetween (the state as illustrated in FIG. 1). During braking, the brake linings 2 move to the brake disk 1a, and are abutted and pressed against the brake disk 1a in a parallel manner.

Each of the brake linings 2 has a back plate part 2a that is supported by a lining holding part 3 of the brake device 100, and a friction member 2b that abuts against the brake disk 1a during braking. The friction member 2b is formed by a plurality of segments, and is fixed to the front surface of the back plate part 2a. The brake lining 2 brakes the rotation of the wheel 1 by friction force caused by abutment of the friction member 2b and the brake disk 1a.

The lining holding part 3 has a dovetail groove (not illustrated), into which the back plate part 2a of the brake lining 2 is inserted. An anchor block 4, fixed to the lining holding part 3 by a pair of anchor bolts 5, is provided at each of the upper and lower end parts of the lining holding part 3. The anchor block 4 fixes the end part along the longitudinal direction (vertical direction in FIG. 2) of the back plate part 2*a* of the brake lining 2. Thereby, the brake lining 2, inserted in the dovetail groove, is held by the lining holding part 3.

The brake device 100 is provided with a brake body 10, a pair of link arms 30 having a support portions 32, between one end portions 31 and the other end portions 33, supported turnably relative to the brake body 10, a coupling rod 35 that serves as a coupling member and that couples the one end portions 31 of the pair of link arms 30, an actuator 20 that is attached to the coupling rod 35 and that is configured to make advancing/retreating movement of a rod 21 serving as an output member, levers 40 that are turnably coupled to the rod 21 of the actuator 20 and that turn by the advancing/retreating movement of the rod 21, a booster unit 50 that is provided on at least one of the one end portions 31 of the pair of link arms 30 and that boosts power, transmitted by the turning of the levers 40, so as to turn the link arms 30 around the support portions 32, and the parking brake unit 101 that causes the wheel 1 to be in a braking state during parking.

When the brake device 100 is applied to the railway vehicle, the brake body 10 is supported by a truck (not illustrated). When the brake device 100 is applied to a vehicle other than the railway vehicle, the brake body 10 is supported by a vehicle body (not illustrated).

The actuator 20 is a fluid pressure actuator that is actuated by pressure of compressed air as hydraulic fluid. Instead of the compressed air, other fluid, such as hydraulic oil, may be used as the hydraulic fluid. The actuator 20 is actuated on the basis of braking operation of a driver, and makes the advancing/retreating movement of the rod 21 relative to an actuator body 20*a* that is attached to the coupling rod 35.

The actuator 20 is provided at the position further separated from the support portions 32 than the position of the one end portions 31 of the link arms 30. Namely, the actuator 20 is provided to be opposed to the brake body 10, with the coupling rod 35 therebetween. As the actuator 20 is thus provided outside the area surrounded by the coupling rod 35 and the pair of link arms 30, design freedom of the link arms 30 improves. As the link arms 30 can be shortened, reduction in size and weight of the brake device 100 is made possible.

Figure 2:
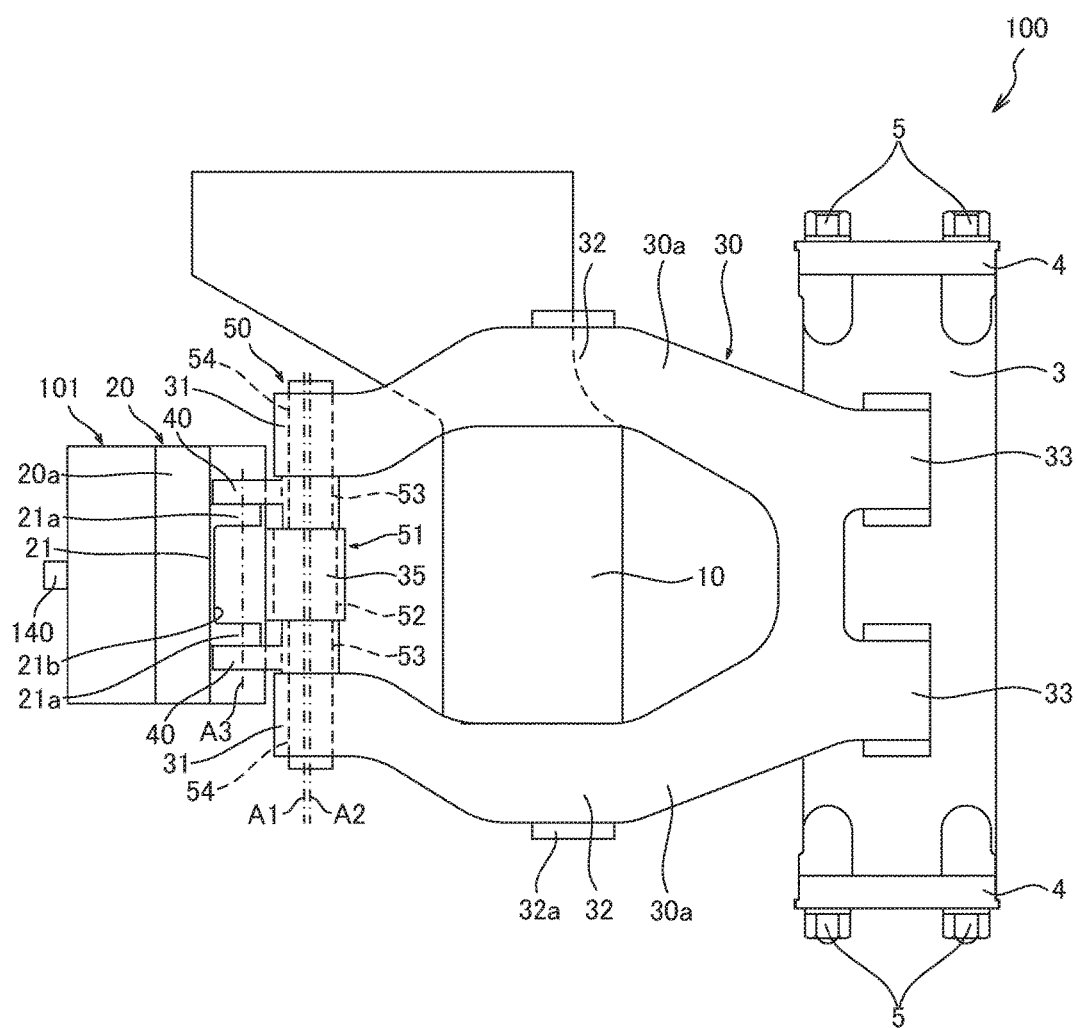
FIG. 2 is a front view of FIG. 1.

As illustrated in FIG. 2, the rod 21 is formed to have a U shape, having coupling parts 21*a* that are respectively coupled to the pair of levers 40, and a recessed part 21*b* that is formed between the pair of coupling parts 21*a*. The recessed part 21*b* avoids interference between the rod 21 and the coupling rod 35 when the rod 21 retreats from the actuator body 20*a*. Thus, when the rod 21 retreats from the actuator body 20*a*, the coupling rod 35 enters the recessed part 21*b*, and the pair of coupling parts 21*a* extends while avoiding the coupling rod 35.

The rod 21 has a pair of coupling shafts 22, each of which turnably couples the lever 40 to each coupling part 21*a* (refer to FIG. 1). The pair of coupling shafts 22 is provided coaxially. Each coupling shaft 22 is disposed in such a manner that its central axis is in parallel with the brake lining 2. On the extension of the central axis, along which the rod 21 makes reciprocating movement, lies the center of the brake disk 1*a*. The rod 21 makes the advancing/retreating movement relative to the actuator body 20*a*, and is able to swing in the direction in which the brake linings 2 can move (vertical direction in FIG. 1).

As illustrated in FIG. 1, the link arms 30 are provided to face both sides of the brake disk 1*a*. The one end portions 31 of the pair of link arms 30 are coupled by the coupling rod 35. The other end portions 33 of the link arms 30 swingably support the brake linings 2 that are brought into slide-contact with the brake disk 1*a* to apply the friction force. As illustrated in FIG. 2, the link arms 30 are formed to have a substantially U shape having a pair of arm portions 30*a* that are provided vertically.

As illustrated in FIG. 1, a coupling shaft 31*a* is provided at the one end portion 31 of one of the link arms 30, the coupling shaft 31*a* penetrating through and coupling the coupling rod 35 and the link arm 30. The booster unit 50 is provided at the one end portion 31 of the other link arm 30, the booster unit 50 penetrating through and coupling the coupling rod 35, the link arm 30, and the pair of levers 40, boosting the power by the advancing/retreating movement of the rod 21 of the actuator 20, and turning the link arms 30.

Instead of this structure, it is possible to provide the booster unit 50 at both of the one end portion 31 of the one link arm 30 and the one end portion 31 of the other link arm 30. In this case, the respective booster units 50 can turn the one link arm 30 and the other link arm 30. Further, the coupling rod may be divided into a first coupling member that is coupled to the one link arm 30 and a second coupling member that is coupled to the other link arm 30, and the booster unit 50 may be provided therebetween. The booster unit 50 will be explained later in detail.

At each support portion 32 of the link arm 30, provided is an arm shaft 32*a* that penetrates through and couples the link arm 30 and the brake body 10. The link arm 30 is turnably supported at the brake body 10 by the arm shaft 32*a*. Tangent force in the circumferential direction, applied from the brake disk 1*a* to the brake lining 2 during braking of the brake device 100, is applied from the support portion 32 via the arm shaft 32*a* to the brake body 10.

At each of the other end portions 33 of the link arm 30, provided is a lining shaft 33*a* that penetrates through and couples the link arm 30 and the lining holding part 3. The lining holding part 3 is turnably supported at the link arm 30 by the lining shaft 33*a*. Thereby, the brake lining 2 is able to swing relative to the link arm 30, and is always able to abut against the brake disk 1*a* in a parallel manner during braking.

Each of the levers 40 transmits the power of the advancing/retreating movement of the rod 21 of the actuator 20 to the booster unit 50. One end portion 41 of the lever 40 is turnably coupled to the coupling shaft 22 of the rod 21. The other end portion 42 of the lever 40 is unturnably coupled to a later-described eccentric part 53 of the booster unit 50.

When the rod 21 makes the advancing/retreating movement relative to the actuator body 20*a*, the lever 40 turns between the coupling shaft 22 and the eccentric part 53. The lever 40 turns to the position that is in parallel with the coupling rod 35, when the rod 21 retreats from the actuator body 20*a* to the maximum degree.

As illustrated in FIG. 2, the booster unit 50 has an eccentric cam 51 that rotates around a rotation axis A1 by the turning of the levers 40. The rotation axis A1 of the eccentric cam 51 is provided in such a manner that its position relative to the link arms 30 agrees with the position of the central axis of the coupling shaft 31*a*.

The eccentric cam 51 has a rotation part 52 that is turnably coupled to the coupling rod 35, the eccentric parts 53 that have a central axis A2 at the position offset from the rotation axis A1 of the eccentric cam 51 and that turn in an arc shape around the rotation axis A1 by the turning of the levers 40, and a pair of arm coupling parts 54 that is formed coaxially with the eccentric parts 53 and that is rotatably supported by the link arms 30. The eccentric cam 51 rotates by advancing/retreating movement of a second piston 120 of the parking brake unit 101, as will be described later.

The rotation part 52 is formed to have the same outer diameter as that of the coupling shaft 31*a*. The central axis of the rotation part 52 is the rotation axis A1 of the eccentric cam 51.

The eccentric parts 53 are formed to have the diameter smaller than that of the rotation part 52. The eccentric parts 53 are provided at both sides in the axial direction of the rotation part 52. The levers 40 are relatively unturnably coupled to the eccentric parts 53. Thus, when the rod 21 makes the advancing/retreating movement relative to the actuator body 20*a* and the levers 40 turn, the eccentric parts 53 turn in an arc shape around the rotation axis A1, and expand/contract the distance between the pair of link arms 30.

The arm coupling parts 54 are formed to have the same diameter as that of the eccentric parts 53. The arm coupling parts 54 are provided on the opposite sides of the rotation part 52, with the eccentric parts 53 therebetween. Instead, it is possible to form the arm coupling parts 54 to have the diameter smaller than that of the eccentric parts 53. Further, the arm coupling parts 54 may be respectively provided between the eccentric parts 53 and the rotation part 52.

Thus, the eccentric cam 51 has the rotation part 52 at its center, the eccentric parts 53 having the diameter smaller than that of the rotation part 52 on its both ends, and the arm coupling parts 54 having the diameter same as that of the eccentric parts 53 or smaller than that of the eccentric parts 53 on its both ends. Thus, the diameter of the eccentric cam 51 becomes gradually smaller from its center toward the both end parts, which facilitates its processing. Further, as the coupling rod 35, the levers 40, and the link arms 30 may be assembled on the eccentric cam 51 in order, excellent assemblability is achieved.

The brake device 100 is further provided with an adjuster 37 that causes the coupling rod 35 to extend according to a wear amount of the brake linings 2. The adjuster 37 is provided outside the area where the actuator 20 is attached. The adjuster 37 causes the coupling rod 35 to extend by extending an adjusting rod 36. When the brake device 100 is in the braking state and the wear of the brake linings 2 is caused, an adjusting screw provided inside the coupling rod 35 (not illustrated) is rotated and the adjuster 37 causes the adjusting rod 36 to extend.

As the adjuster 37 is thus provided on the coupling rod 35 outside the area where the actuator 20 is attached, positional relationship between the actuator 20 and the booster unit 50 does not change even when the wear of the brake linings 2 is caused and the coupling rod 35 is extended. Thus, operation characteristics of the actuator 20 can remain unchanged, even when the wear of the brake linings 2 is caused.

Next, the structure of the parking brake unit 101 will be explained with reference to FIGS. 3A and 3B.

The parking brake unit 101 is applied to the above-described brake device 100, in which the rod 21 of the actuator 20 presses the brake linings 2 against the brake disk 1*a*, by the supply of the compressed air, so as to brake the wheel 1.

The parking brake unit 101 is provided with a housing 102 that is attached to the actuator body 20*a*, a first piston 110 that is configured to move inside the housing 102 in the first direction by the pressure of the compressed air supplied to a pressure chamber 105 defined in the back thereof, a biasing spring 118 that is configured to bias the first piston 110 in the second direction, opposite to the first direction, and that serves as a first biasing member, the second piston 120 that is slidably provided on the inner circumference of the first piston 110, engaging members 130 that is configured to cause the first piston 110 and the second piston 120 to engage with each other in such an operation state where the braking of the wheel 1 is possible and that is configured to release the engagement between the first piston 110 and the second piston 120 when releasing operation is made, and a releasing rod 140 that is slidably provided on the inner circumference of the second piston 120 and that serves as a releasing member.

Figure 3A:
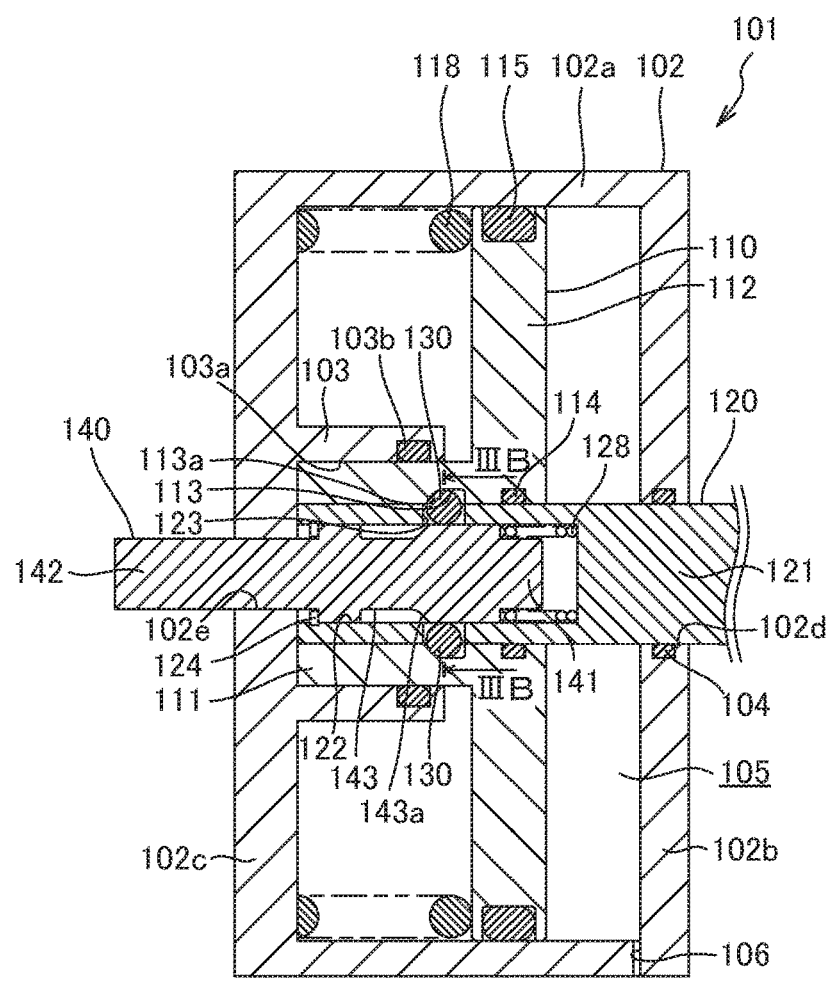
FIG. 3A is a cross-sectional view illustrating a non-braking state of the parking brake unit according to the first embodiment of the present invention.

Here, the direction in which the brake device 100 is switched from a non-braking state to a braking state by pressing the rod 21 of the actuator 20 is the second direction (right direction in FIG. 3A), and the direction in which the brake device 100 is switched from the braking state to the non-braking state is the first direction (left direction in FIG. 3A).

Further, the releasing operation means such operation for an operator to press the releasing rod 140 into the second piston 120, against biasing force of a later-described biasing spring 128, and to forcibly switch the brake device 100 into the non-braking state, when the brake device 100 is in the braking state by the parking brake unit 101.

The housing 102 has a cylindrical part 102*a* that is formed in a cylindrical shape, a first bottom part 102*b* that closes one end of the cylindrical part 102*a*, and a second bottom part 102*c* that closes the other end of the cylindrical part 102*a*. Inside the housing 102, the pressure chamber 105 is defined between the first piston 110 and the first bottom part 102*b*.

The first piston 110 slides on the inner circumferential surface of the cylindrical part 102*a*. A supply/discharge passage 106 for supplying/discharging the compressed air to/from the pressure chamber 105 is provided in the cylindrical part 102*a*. On the basis of operation of the driver, the compressed air is supplied to/discharged from the pressure chamber 105 via the supply/discharge passage 106.

The first bottom part 102*b* formed to have a substantially disk shape is attached to the actuator body 20*a*. A through hole 102*d*, through which the second piston 120 is slidably inserted, is formed at the center of the first bottom part 102*b*. An O-ring 104 for sealing the sliding surface between the first bottom part 102*b* and the second piston 120 is provided on the first bottom part 102*b*.

The second bottom part 102*c* is formed in a substantially disk shape. The releasing rod 140 is slidably inserted at the center of the second bottom part 102*c*. A piston guide 103, for guiding the first piston 110 to be able to slide in the axial direction, is standingly provided on the inner surface of the second bottom part 102*c*.

The piston guide 103 is formed in a cylindrical shape that is coaxial with the housing 102. An O-ring 103*b*, for sealing the space between the piston guide 103 and the first piston 110, is provided on an inner circumferential surface 103*a* of the piston guide 103.

The first piston 110 moves inside the housing 102 in the axial direction by a difference between the power of the pressure of the compressed air inside the pressure chamber 105 and the biasing force of the biasing spring 118. The first piston 110 has a cylindrical part 111 that is formed in a cylindrical shape and a disk part 112 that is formed in a disk shape at the end of the cylindrical part 111. The first piston 110 is arranged in such a manner that the cylindrical part 111 is inserted to the inner circumference of the piston guide 103.

The outer circumference of the cylindrical part 111 is formed to have the approximately same diameter as that of the inner circumferential surface 103*a* of the piston guide 103. On the inner circumference of the cylindrical part 111, first engaging grooves 113 serving as a first engaging part are provided.

Each of the first engaging grooves 113 is formed in an arc shape around the central axis of the first piston 110. The first engaging groove 113 is formed to have the circumferential length that is approximately the same as the circumferential length of the engaging member 130. The end part of the first engaging groove 113 on the side of the disk part 112 is the surface perpendicular to the central axis. Meanwhile, the end part of the first engaging groove 113 on the side of the opening end of the cylindrical part 111 forms a curved surface part 113a that has a curved surface corresponding to the outer shape of the engaging member 130.

The disk part 112 is formed to have the diameter that is approximately the same as the inner circumference of the cylindrical part 102a. The disk part 112 is formed integrally with the cylindrical part 111. The back surface of the disk part 112 faces against the pressure chamber 105. The disk part 112 is biased toward the first bottom part 102b by the biasing spring 118.

A through hole, formed continuously to the inner circumference of the cylindrical part 111, is provided at the center of the disk part 112. An O-ring 114, for sealing the sliding surface between the disk part 112 and the second piston 120, is provided on the inner circumference of the disk part 112. An O-ring 115, for sealing the sliding surface between the disk part 112 and the inner circumferential surface of the cylindrical part 102a, is provided on the outer circumference of the disk part 112.

When the first piston 110 moves in the second direction, the second piston 120 moves the rod 21 in the direction in which the wheel 1 is brought into the braking state. The second piston 120 has a pressing part 121 that is formed in a column shape and that presses the rod 21 of the actuator 20, and a cylindrical part 122 that is formed in a cylindrical shape and that is formed continuously from the pressing part 121 in the axial direction. The second piston 120 is arranged in such a manner that the cylindrical part 122 is inserted to the inner circumference of the first piston 110.

The pressing part 121 protrudes from the through hole 102d of the first bottom part 102b to the outside of the housing 102. The pressing part 121 is inserted to the inside of the actuator 20 and presses the rod 21 from behind.

The releasing rod 140 and the biasing spring 128 serving as a second biasing member that is configured to bias the releasing rod 140 against the second piston 120 in the axial direction are inserted into the cylindrical part 122. Near the opening end of the cylindrical part 122, provided is a retaining ring 124 that prevents the releasing rod 140 from coming off the second piston 120. The cylindrical part 122 has second engaging grooves 123, as a second engaging part, that are formed to penetrate in the radial direction.

Each of the second engaging grooves 123 is formed in an arc shape at the circumferential position corresponding to the first engaging groove 113 on the inner circumference of the first piston 110. The second engaging groove 123 is formed to have an arc shape around the central axis of the first piston 110. The second engaging groove 123 is formed to have the circumferential length that is approximately the same as the circumferential length of the engaging member 130. Both ends of the second engaging groove 123 in the axial direction form the surfaces perpendicular to the central axis of the first piston 110.

Figure 3B:
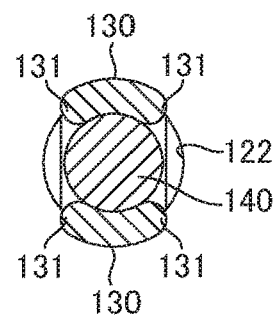
FIG. 3B is a cross-sectional taken along the IIIB-IIIB line of FIG. 3A.

As illustrated in FIG. 3B, each engaging member 130 is formed to have a circular cross section and in an arc shape corresponding to the first engaging groove 113 and the second engaging groove 123. Therefore, the engaging member 130 is brought into line contact or surface contact with the first engaging groove 113 and the second engaging groove 123 by circular arc. This makes it possible to efficiently transmit the power from the first piston 110 to the second piston 120, and to improve durability due to the reduction in the surface pressure at the contact part.

Both end parts 131 of the engaging member 130 in the circumferential direction are rounded to have globular shapes. A pair of the engaging members 130 is provided in such a manner that the engaging members 130 are opposed to each other with the central axes of the first piston 110, the second piston 120, and the releasing rod 140 therebetween. This is not restrictive, and three or more engaging members 130 may be provided at equal intervals along the circumferential direction.

In the operation state where the braking of the wheel 1 is possible, the engaging members 130 cause the first engaging grooves 113 and the second engaging grooves 123 to engage with each other. When the releasing operation is made, the engaging members 130 release the engagement with the first engaging grooves 113.

With the releasing rod 140, one end 141 is inserted to the cylindrical part 122 of the second piston 120, and the other end 142 protrudes from a through hole 102e of the second bottom part 102c to the outside of the housing 102. The one end 141 of the releasing rod 140 abuts against the biasing spring 128 that is housed in the cylindrical part 122. The other end 142 of the releasing rod 140 can be subjected to pressing operation by the operator. Third engaging grooves 143 serving as a third engaging part are provided in the outer circumference of the releasing rod 140.

Each of the third engaging grooves 143 is formed in an arc shape having curvature that is the same as that of the inner circumference of each engaging member 130. An inclined part 143a that inclines to reduce it depth gradually is provided at the end of the third engaging groove 143 on the side of the one end 141. Meanwhile, the end of the third engaging groove 143 on the side of the other end 142 forms the surface perpendicular to the central axis of the first piston 110.

When the releasing rod 140 is pressed into the second piston 120 against the biasing force of the biasing spring 128, the engaging members 130 cause the second engaging grooves 123 and the third engaging grooves 143 to engage with each other so that the engagement between the first engaging grooves 113 and the second engaging grooves 123 is released.

Next, the operation of the brake device 100 will be explained with reference to FIGS. 1 and 2.

When the actuator 20 is actuated on the basis of the braking operation of the driver, the brake device 100 changes from the non-braking state (the state as illustrated in FIG. 1 and FIG. 2) to the braking state.

When the actuator 20 is actuated and the rod 21 retreats from the actuator body 20a, the levers 40 are pressed and turned by the coupling shafts 22. The power of the actuator 20 retreating the rod 21 is transmitted to the eccentric parts 53 of the eccentric cam 51 via the levers 40.

The power transmitted via the levers 40 makes the eccentric parts 53 turn in an arc shape around the rotation axis A1, and then the eccentric cam 51 rotates in one direction (clockwise in FIG. 1). Thereby, the arm coupling parts 54, together with the eccentric parts 53, turn in the direction separating from the rod 21, and the one end portions 31 of the pair of link arms 30 move in the direction separating from each other.

The link arms 30 are supported by the support portions 32 to be able to turn relative to the brake body 10, and when the one end portions 31 move in the direction separating from each other, the other end portions 33 move in the direction approaching each other. Thus, the brake linings 2 move to the brake disk 1a, and are abutted and pressed against the brake disk 1a in a parallel manner, so as to brake the rotation of the wheel 1.

At this time, the eccentric cam 51 boosts the power, transmitted from the rod 21 via the levers 40, to be L1/L2 times greater, by a lever ratio between a distance L1 from a rotation axis A3 of the coupling shafts 22 to the rotation axis A1 and a distance L2 from the rotation axis A1 to the central axis A2 of the eccentric parts 53, and transmits the power to the link arms 30. This makes it possible to obtain greater braking power without a large-sized actuator. Thus, reduction in size and weight of the brake device 100 is made possible.

Further, the link arms 30 are supported in such a manner that the support portions 32, between the one end portions 31 and the other end portions 33, are able to turn relative to the brake body 10. The eccentric cam 51 that boosts the power transmitted to the rod 21 by the turning of the levers 40 and turns the link arms 30 is provided on the one end portion 31 of the link arm 30. Therefore, the tangent force in the circumferential direction, applied from the brake disk 1a to the brake linings 2 during braking of the brake device 100, is applied to the arm shafts 32a of the support portions 32, not to the eccentric cam 51. Thus, frictional resistance upon the rotation of the eccentric cam 51 does not increase, which makes it possible to improve mechanical efficiency of the brake device 100 during braking.

The power transmitted from the eccentric cam 51 to the one end portion 31 of the link arm 30 is boosted to be L3/L4 times greater, by a lever ratio between a distance L3 from the one end portions 31 to the support portions 32 and a distance L4 from the support portions 32 to the other end portions 33. As the distance L4 is greater than the distance L3 in the brake device 100, the power pressing the brake linings 2 against the brake disk 1a is smaller than the power transmitted from the eccentric cam 51 to the one end portions 31 of the link arms 30.

However, with the brake device 100, the power transmitted by the eccentric cam 51 from the rod 21 of the actuator 20 via the levers 40 is boosted by the greater rate. Therefore, the braking power that is great enough can be obtained, even when the link arms 30 are shortened and the distance L3 is made smaller for the purpose of the reduction in size and weight of the brake device 100.

Incidentally, as the eccentric cam 51 is provided at the one end portions 31 of the link arms 30 in the brake device 100, the design freedom of the position of the arm shafts 32a of the support portions 32 improves. For this reason, it is possible to arrange the arm shaft 32a at the position facing the side surfaces of the wheel 1. Thus, the distance L3 can be made greater than the distance L4, and the brake linings 2 can be pressed against the brake disk 1a by further boosting the power boosted by the eccentric cam 51.

When the actuator 20 is actuated in the direction opposite to that during braking, on the basis of braking releasing operation of the driver, the brake device 100 changes from the braking state to the non-braking state (the state as illustrated in FIG. 1 and FIG. 2).

When the actuator 20 is actuated and the rod 21 enters the actuator body 20a, the levers 40 are pulled and turned by the coupling shafts 22. The power of the actuator 20 causing the entering of the rod 21 is transmitted via the levers 40 to the eccentric parts 53 of the eccentric cam 51.

The eccentric parts 53 turn in an arc shape around the rotation axis A1, by the power transmitted via the levers 40, and the eccentric cam 51 rotates in the other direction (counterclockwise in FIG. 1). Thereby, the one end portions 31 of the pair of link arms 30 move in the direction approaching each other. Then, the other end portions 33 of the pair of link arms 30 move in the direction separating from each other. Thus, the brake linings 2 separate from the brake disk 1a, and the braking of the wheel 1 is released.

Next, the operation of the parking brake unit 101 will be explained with reference to FIGS. 3A to 5.

FIG. 3A illustrates the state where the compressed air is supplied to the pressure chamber 105, and the brake device 100 is brought into the non-braking state by the parking brake unit 101. When the vehicle is parked, and the compressed air in the pressure chamber 105 is discharged via the supply/discharge passage 106 from the state as illustrated in FIG. 3A on the basis of the operation of the driver or the operator, the state as illustrated in FIG. 4 is made.

Figure 4:
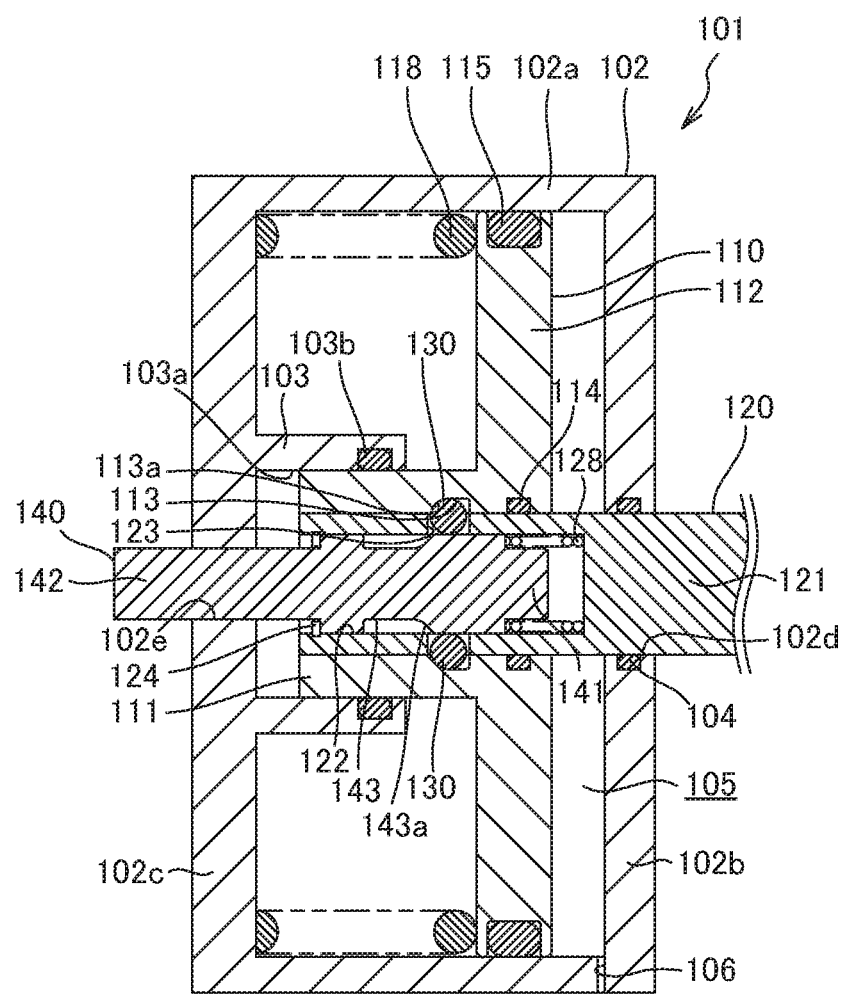
FIG. 4 is a cross-sectional view illustrating a braking state of the parking brake unit according to the first embodiment of the present invention.

At this time, the biasing force of the biasing spring 118 becomes greater than the power of the pressure of the compressed air in the pressure chamber 105, and the first piston 110 moves in the direction approaching the actuator 20 (right direction in FIG. 4). As the first piston 110 and the second piston 120 are engaged with each other by the engaging members 130, the second piston 120 also moves in the direction approaching the actuator 20. The second piston 120 presses from behind and moves the rod 21 of the actuator 20, and causes the eccentric cam 51 to rotate via the levers 40. Thus, the brake device 100 is brought into the braking state. Namely, the second piston 120 causes the eccentric cam 51 to rotate via the rod 21 and the levers 40, and causes the brake linings 2 to move.

When the compressed air in the pressure chamber 105 is discharged like this, the first piston 110 moves by the biasing force of the biasing spring 118. Thereby, the second piston 120 engaging with the first piston 110 via the engaging members 130 causes the rod 21 of the actuator 20 of the brake device 100 to move in the direction in which the brake device 100 is brought into the braking state. Thus, the parking brake unit 101 switches the brake device 100 into the braking state when the compressed air in the pressure chamber 105 is discharged. Therefore, the parking brake unit 101 that is applicable to positive brakes can be provided.

Figure 5:
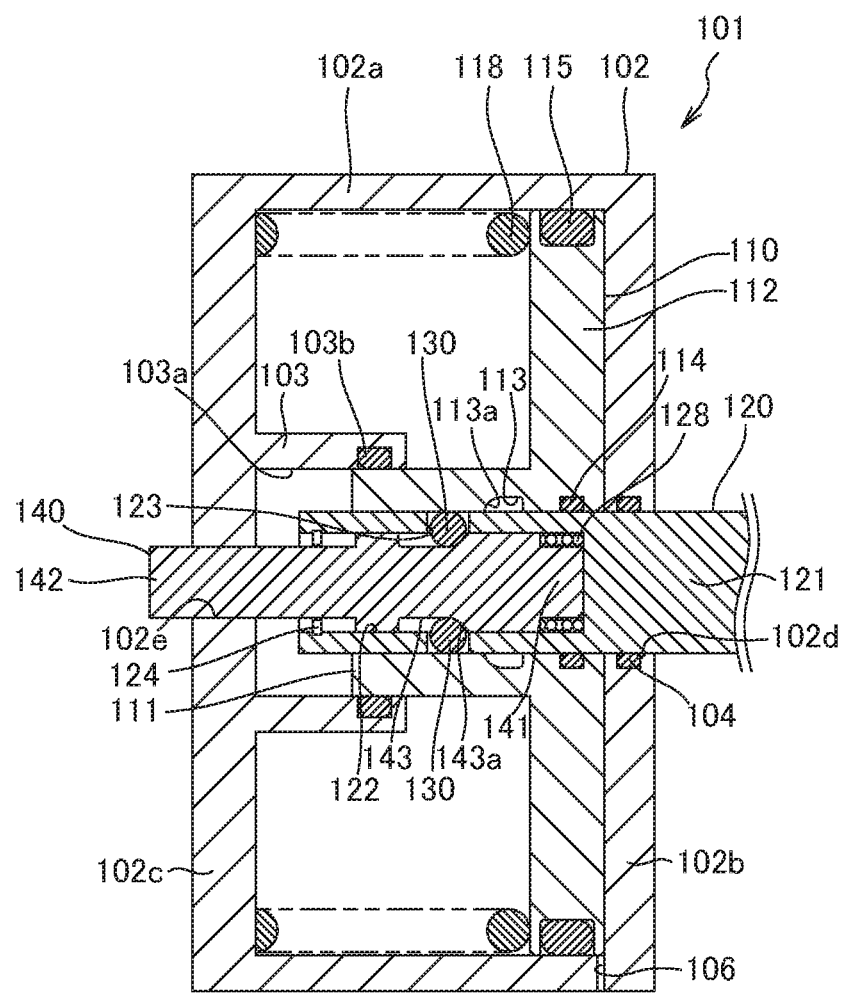
FIG. 5 is a cross-sectional view illustrating a release state of the parking brake unit according to the first embodiment of the present invention.

When some trouble occurs in a pneumatic pressure circuit that supplies the compressed air, and the compressed air cannot be supplied to the pressure chamber 105, a state where the parking brake unit 101 causes the brake device 100 to be in the braking state is maintained. At this time, when the operator presses the releasing rod 140 into the second piston 120 against the biasing force of the biasing spring 128, the state as illustrated in FIG. 5 is made.

When the releasing rod 140 is pressed into the second piston 120, and all of the first engaging groove 113 of the first piston 110, the second engaging groove 123 of the second piston 120 and the third engaging groove 143 of the releasing rod 140 communicate with each other, each engaging member 130 receives the biasing force of the biasing spring 118 to be pushed out by the curved surface part 113a of the first engaging groove 113. Thereby, the second engaging groove 123 and the third engaging groove 143 engage with each other, and the engagement between the second engaging groove 123 and the first engaging groove 113 is released. Therefore, the second piston 120 is allowed to slide in the axial direction relative to the first piston 110.

Thereby, even when the biasing force of the biasing spring 118 is applied to the first piston 110, the second piston 120 can make the advancing/retreating movement freely. Therefore, by the operation of the actuator 20, the brake device 100 can be switched from the braking state to the non-braking state. Even when some trouble occurs in the pneumatic pressure circuit that supplies the compressed air, and the compressed air cannot be supplied to the pressure chamber 105, it is possible to switch the brake device 100 from the braking state to the non-braking state.

When the pneumatic pressure circuit that supplies the compressed air recovers, the compressed air is supplied to the pressure chamber 105 via the supply/discharge passage 106. At this time, the power of the pressure of the compressed air in the pressure chamber 105 becomes greater than the biasing force of the biasing spring 118, and the first piston 110 moves in the direction away from the actuator 20.

When the first piston 110 moves, and all of the first engaging groove 113 of the first piston 110, the second engaging groove 123 of the second piston 120, and the third engaging groove 143 of the releasing rod 140 communicate with each other, each engaging member 130 receives the biasing force of the biasing spring 128 to be pushed out by the inclined part 143a of third engaging groove 143, and causes the second engaging groove 123 and the first engaging groove 113 to engage with each other. Thereby, the engagement between the second engaging groove 123 and the third engaging groove 143 is released. Thus, the second piston 120 engaging with the first piston 110 can slide integrally in the axial direction.

Thus, when the pneumatic pressure circuit that supplies the compressed air recovers, the recovery is made to such an operation state where the switching between the braking state and the non-braking state can be made by the parking brake unit 101 supplying/discharging the compressed air to/from the pressure chamber 105, only by supplying the compressed air via the supply/discharge passage 106 to the pressure chamber 105.

The following effects can be obtained according to the above-described first embodiment.

The first piston 110 moves in the first direction by the pressure of the compressed air supplied to the pressure chamber 105, and moves in the second direction, opposite to the first direction, by the biasing force of the biasing spring 118. When the compressed air in the pressure chamber 105 is discharged, the first piston 110 moves in the second direction by the biasing force of the biasing spring 118. Thereby, the second piston 120 that engages with the first piston 110 via the engaging members 130 moves the rod 21 of the actuator 20 of the brake device 100 in the direction in which the wheel 1 is brought into the braking state. Thus, the parking brake unit 101 that is applicable to the positive brakes can be provided.

When the releasing rod 140 is pressed into the second piston 120 against the biasing force of the biasing spring 128, the engaging members 130 cause the second engaging grooves 123 and the third engaging grooves 143 to engage with each other, and cause the engagement between the first engaging grooves 113 and the second engaging grooves 123 to be released. Thereby, the sliding of the second piston 120 in the axial direction relative to the first piston 110 is made possible. Therefore, the brake device 100 can be switched from the braking state to the non-braking state by the operation of the actuator 20. Even when some trouble occurs in the pneumatic pressure circuit that supplies the compressed air, and the compressed air cannot be supplied to the pressure chamber 105, it is possible to switch the brake device 100 from the braking state to the non-braking state.

Second Embodiment

Hereinafter, a parking brake unit 201 according to a second embodiment of the present invention will be explained with reference to FIGS. 6 to 9. In the following embodiments, the same numerals and symbols are given to designate the same structures as those of the above-described first embodiment, and repeated explanations are omitted as appropriate.

The second embodiment is different from the first embodiment in the position where the actuator 20 of a brake device 200 is mounted to a parking brake unit 201.

First, the entire structure of the brake device 200, to which the parking brake unit 201 is applied, will be explained with reference to FIG. 6.

The brake device 200 is provided with the brake body 10, the pair of link arms 30 having support portions 32, between the one end portions 31 and the other end portions 33, supported turnably relative to the brake body 10, the coupling rod 35 that serves as the coupling member and that couples the one end portions 31 of the pair of link arms 30, the actuator 20 that is attached to the coupling rod 35 and configured to make the advancing/retreating movement of the rod 21 serving as the output member, the levers 40 that are turnably coupled to the rod 21 of the actuator 20 and that turn by the advancing/retreating movement of the rod 21, the booster unit 50 that is provided on at least one of the one end portions 31 of the pair of link arms 30 and that boosts the power, transmitted by the turning of the levers 40, so as to turn the link arms 30 around the support portions 32, and the parking brake unit 201 that causes the wheel 1 to be in the braking state during parking.

The actuator 20 is provided at the position closer to the support portions 32 than the position of the one end portions 31 of the link arms 30. Namely, the actuator 20 is provided inside the area surrounded by the coupling rod 35 and the pair of link arms 30.

The parking brake unit 201 is provided to be opposed to the actuator 20, with the coupling rod 35 therebetween. As the actuator 20 and the parking brake unit 201 are provided like this, with the coupling rod 35 therebetween, excellent weight balance can be achieved.

Next, the structure of the parking brake unit 201 will be explained mainly with reference to FIG. 7.

The parking brake unit 201 is provided with a housing 202 that is attached to the coupling rod 35, a first piston 210 that moves inside the housing 202 in the first direction by the pressure of the compressed air supplied to the pressure chamber 105 defined in the back thereof, the biasing spring 118 that is configured to bias the first piston 210 in the second direction, opposite to the first direction, and that serves as the first biasing member, a second piston 220 that is slidably provided on the inner circumference of the first piston 210, the engaging members 130 that cause the first piston 210 and the second piston 220 to engage with each other in such an operation state where the braking of the wheel 1 is possible and cause the engagement between the first piston 210 and the second piston 220 to be released when the releasing operation is made, and the releasing rod 140 that is slidably provided on the inner circumference of the second piston 220 and that serves as the releasing member.

Figure 7:
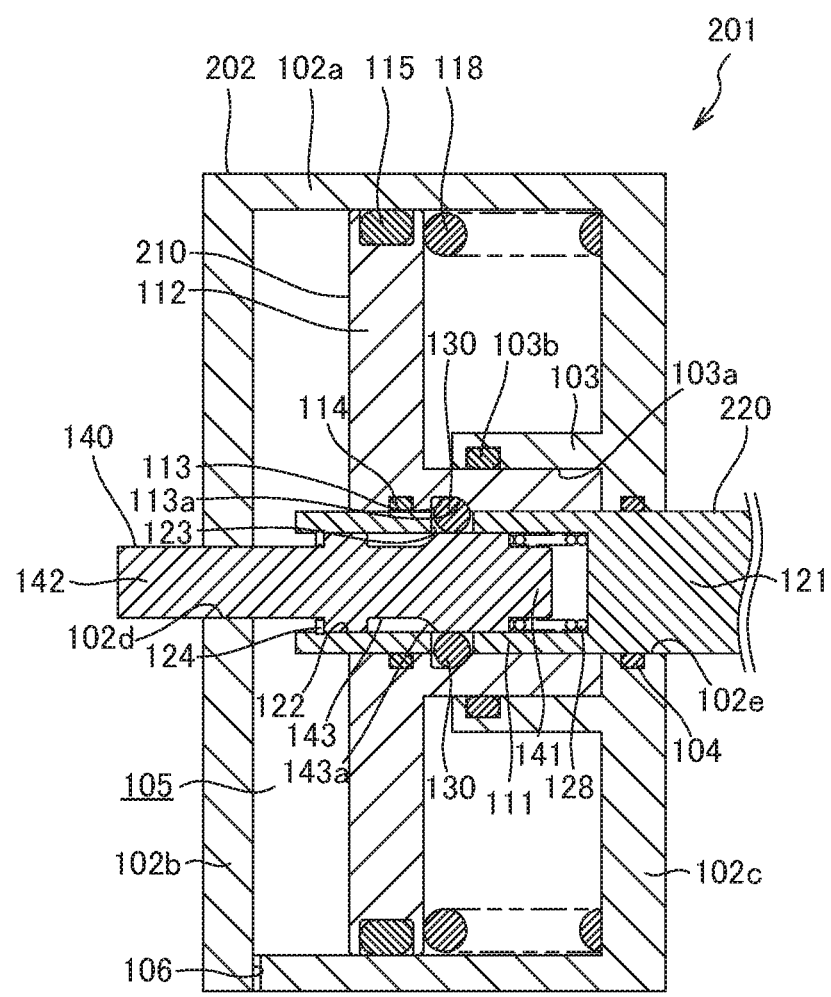
FIG. 7 is a cross-sectional view illustrating a non-braking state of the parking brake unit according to the second embodiment of the present invention.

Here, the direction in which the brake device 200 is switched from the non-braking state to the braking state by pulling the rod 21 of the actuator 20 is the second direction (left direction in FIG. 7), and the direction in which the brake device 200 is switched from the braking state to the non-braking state is the first direction (right direction in FIG. 7).

It is necessary for the parking brake unit 201 to pull the rod 21 of the actuator 20 at the time when the brake device 200 is switched to the braking state. For this reason, the housing 202 and the first piston 210 are provided reversely to the housing 102 and the first piston 110 according to the first embodiment. Specifically, according to the first embodiment, the second piston 120 is inserted through the first bottom part 102b of the housing 102 and the releasing rod 140 is inserted through the second bottom part 102c. On the other hand, according to the second embodiment, the second piston 220 is inserted through the second bottom part 102c of the housing 202 and the releasing rod 140 is inserted through the first bottom part 102b.

Figure 6:
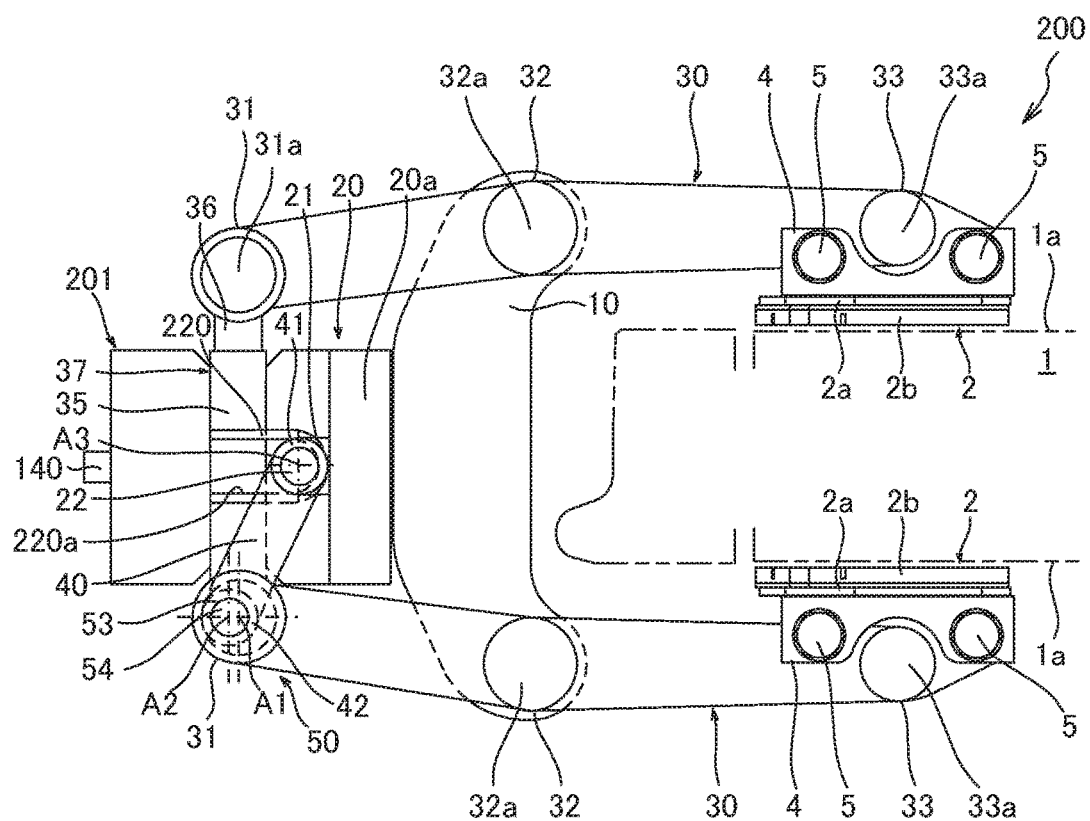
FIG. 6 is a plan view of a brake device to which a parking brake unit according to a second embodiment of the present invention is applied.

Further, the tip end of the second piston 220 is formed to have a U-shape having a groove part 220a, as illustrated in FIG. 6. Thereby, even when the actuator 20 is actuated and the rod 21 retreats from the actuator body 20a, the coupling shafts 22 enter the groove part 220a, and therefore the second piston 220 is not pressed. Meanwhile, when the compressed air is supplied to the pressure chamber 105 of the parking brake unit 201, it is possible for the second piston 220 to pull the coupling shafts 22.

Next, the operation of the parking brake unit 201 will be explained with reference to FIGS. 7 to 9.

FIG. 7 illustrates the state where the compressed air is supplied to the pressure chamber 105, and the brake device 200 is brought into the non-braking state by the parking brake unit 201. When the vehicle is parked, and the compressed air in the pressure chamber 105 is discharged via the supply/discharge passage 106 from the state as illustrated in FIG. 7, on the basis of the operation of the driver or the operator, the state as illustrated in FIG. 8 is made.

Figure 8:
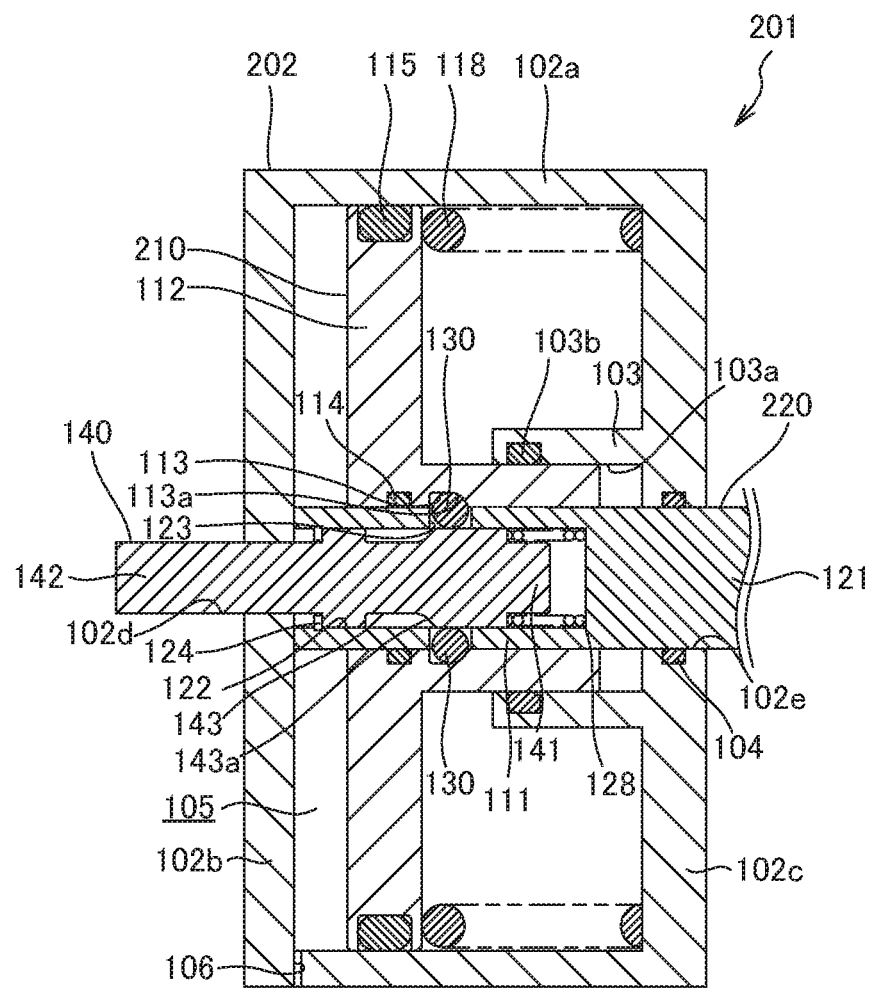
FIG. 8 is a cross-sectional view illustrating a braking state of the parking brake unit according to the second embodiment of the present invention.
Figure 9:
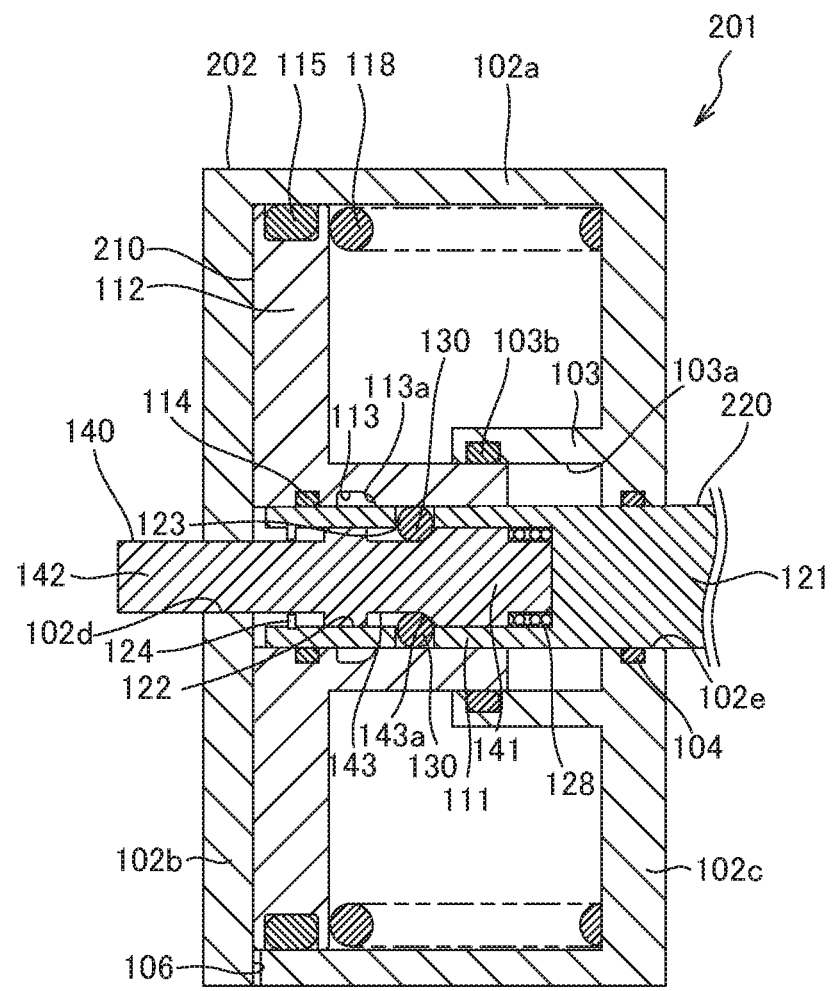
FIG. 9 is a cross-sectional view illustrating a release state of the parking brake unit according to the second embodiment of the present invention.

At this time, the biasing force of the biasing spring 118 becomes greater than the power of the pressure of the compressed air in the pressure chamber 105, and the first piston 210 moves in the direction away from the actuator 20 (left direction in FIG. 8). As the first piston 210 and the second piston 220 are engaged with each other by the engaging members 130, the second piston 220 also moves in the direction away from the actuator 20. Thus, the second piston 220 pulls and moves the rod 21 of the actuator 20, and the brake device 200 is brought into the braking state.

As described above, when the compressed air in the pressure chamber 105 is discharged, the first piston 210 moves by the biasing force of the biasing spring 118. Thereby, the second piston 220 engaging with the first piston 210 via the engaging members 130 causes the rod 21 of the actuator 20 of the brake device 200 to move in the direction in which the brake device 200 is brought into the braking state. Thus, the parking brake unit 201 switches the brake device 200 into the braking state when the compressed air in the pressure chamber 105 is discharged. Therefore, the parking brake unit 201 that is applicable to positive brakes can be provided.

When some trouble occurs in the pneumatic pressure circuit that supplies the compressed air, and the compressed air cannot be supplied to the pressure chamber 105, a state where the parking brake unit 201 causes the brake device 200 to be in the braking state is maintained. At this time, when the operator presses the releasing rod 140 into the second piston 220 against the biasing force of the biasing spring 128, the state as illustrated in FIG. 9 is made.

When the releasing rod 140 is pressed into the second piston 220, and all of the first engaging groove 113 of the first piston 210, the second engaging groove 123 of the second piston 220 and the third engaging groove 143 of the releasing rod 140 communicate with each other, each engaging member 130 receives the biasing force of the biasing spring 118 to be pushed out by the curved surface part 113a of the first engaging groove 113. Thereby, the second engaging groove 123 and the third engaging groove 143 engage with each other, and the engagement between the second engaging groove 123 and the first engaging groove 113 is released. Therefore, the second piston 220 is allowed to slide in the axial direction relative to the first piston 210.

Thereby, even when the biasing force of the biasing spring 118 is applied to the first piston 210, the second piston 220 can make the advancing/retreating movement freely. Thus, by the operation of the actuator 20, the brake device 200 can be switched from the braking state to the non-braking state. Therefore, even when some trouble occurs in the pneumatic pressure circuit that supplies the compressed air, and the compressed air cannot be supplied to the pressure chamber 105, it is possible to switch the brake device 200 from the braking state to the non-braking state.

The same effects as those of the first embodiment can be obtained by the above-described second embodiment. Further, according to the second embodiment, the parking brake unit 201 is provided to be opposed to the actuator 20 with the coupling rod 35 therebetween. As the actuator 20 and the parking brake unit 201 are provided like this with the coupling rod 35 therebetween, the excellent weight balance can be achieved.

When the pneumatic pressure circuit that supplies the compressed air recovers, the compressed air is supplied to the pressure chamber 105 via the supply/discharge passage 106. At this time, the power of the pressure of the compressed air in the pressure chamber 105 becomes greater than the biasing force of the biasing spring 118, and the first piston 210 moves in the direction approaching the actuator 20.

When the first piston 210 moves, and all of the first engaging groove 113 of the first piston 210, the second engaging groove 123 of the second piston 220, and the third engaging groove 143 of the releasing rod 140 communicate with each other, each engaging member 130 receives the biasing force of the biasing spring 128 to be pushed out by the inclined part 143a of third engaging groove 143, and causes the second engaging groove 123 and the first engaging groove 113 to engage with each other. Thereby, the engagement between the second engaging groove 123 and the third engaging groove 143 is released. Thus, the second piston 220, engaging with the first piston 210, can slide integrally in the axial direction.

Thus, when the pneumatic pressure circuit that supplies the compressed air recovers, the recovery is made to such an operation state where the switching between the braking state and the non-braking state can be made by the parking brake unit 201 supplying/discharging the compressed air to/from the pressure chamber 105, only by supplying the compressed air via the supply/discharge passage 106 to the pressure chamber 105.

Third Embodiment

Hereinafter, a parking brake unit 301 according to a third embodiment of the present invention will be explained with reference to FIGS. 10 and 11.

With the parking brake unit 101 according to the above-described first embodiment, the second piston 120 presses from behind and moves the rod 21 of the actuator 20, and causes the brake linings to be pressed against the brake disk via the levers 40 and the link arms. Thereby, the brake device 100 is brought into the braking state.

With the parking brake unit 301, on the other hand, a parking lever 340, in addition to the levers 40, is attached to an eccentric cam 351. A second piston 320 causes the eccentric cam 351 to rotate via the parking lever 340, and a brake device 300 is brought into the braking state. Thus, the third embodiment is different from the first embodiment in that the brake device is brought into the braking state by rotating the eccentric cam, not by turning the levers by moving the rod, but by moving the parking lever, by the movement of the second piston.

Figure 10:
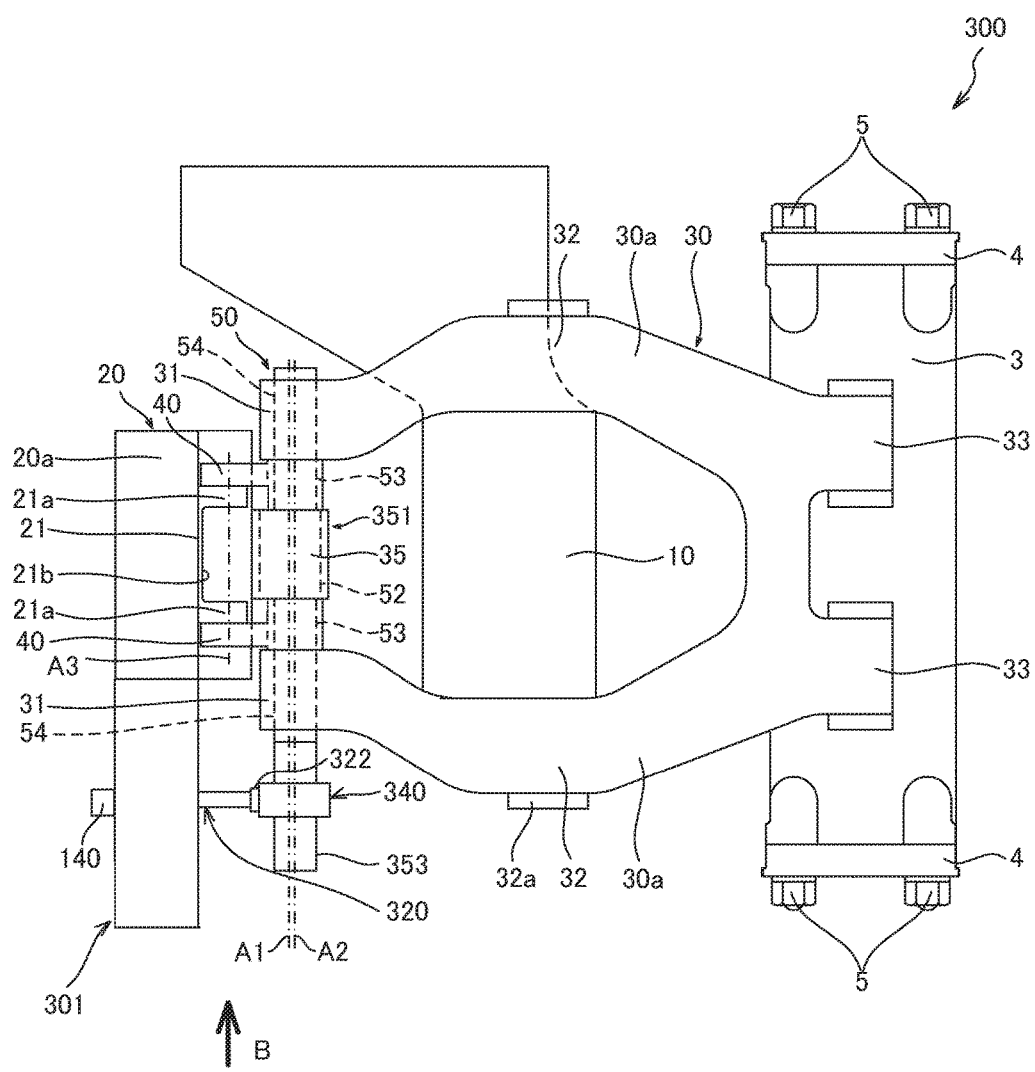
FIG. 10 is a front view of a parking brake according to a third embodiment of the present invention.

With the parking brake unit 301, as illustrated in FIG. 10, the cylindrical part 102a of the housing 102 (refer to FIG. 3) is attached to the lower part of the actuator body 20a (lower direction in FIG. 10). Namely, the parking brake unit 301 is provided next to the actuator 20 of the brake device 300 along the central axis direction of the eccentric cam 351 (vertical direction in FIG. 10). Generally, dead space is formed under the brake device 300, and when the actuator 20 and the parking brake unit 301 are provided next to each other along the central axis direction of the eccentric cam 351 (vertical direction of the vehicle), it is possible to reduce the dead space and to achieve space saving.

The brake device 300, to which the parking brake unit 301 is applied, is further provided with the parking lever 340 attached to the eccentric cam 351.

The eccentric cam 351 is further provided with a second eccentric part 353 to which one end portion 340a of the parking lever 340 (refer to FIG. 11) is coupled. The second eccentric part 353 has a central axis at the position offset from the central axis A1 of the rotation part 52. The second eccentric part 353 is formed to extend in the axial direction from the lower eccentric part 53 (lower side in FIG. 10) out of the two eccentric parts 53 of the eccentric cam 351, in such a manner that the central axis thereof is arranged coaxially with the central axis A2 of the eccentric part 53. Namely, the second eccentric part 353 is provided to extend toward the lower part of the brake device 300.

The second eccentric part 353 may be formed integrally with the rotation part 52 and the eccentric part 53, or may be formed separately and attached to the lower eccentric part 53. Further, the outer diameter of the second eccentric part 353 may be the same as or different from that of the eccentric part 53. Furthermore, the central axis of the second eccentric part 353 may not be coaxial with the central axis A2 of the eccentric part 53, as long as the central axis of the second eccentric part 353 is arranged at the position offset from the central axis A1 of the rotation part 52.

Figure 11:
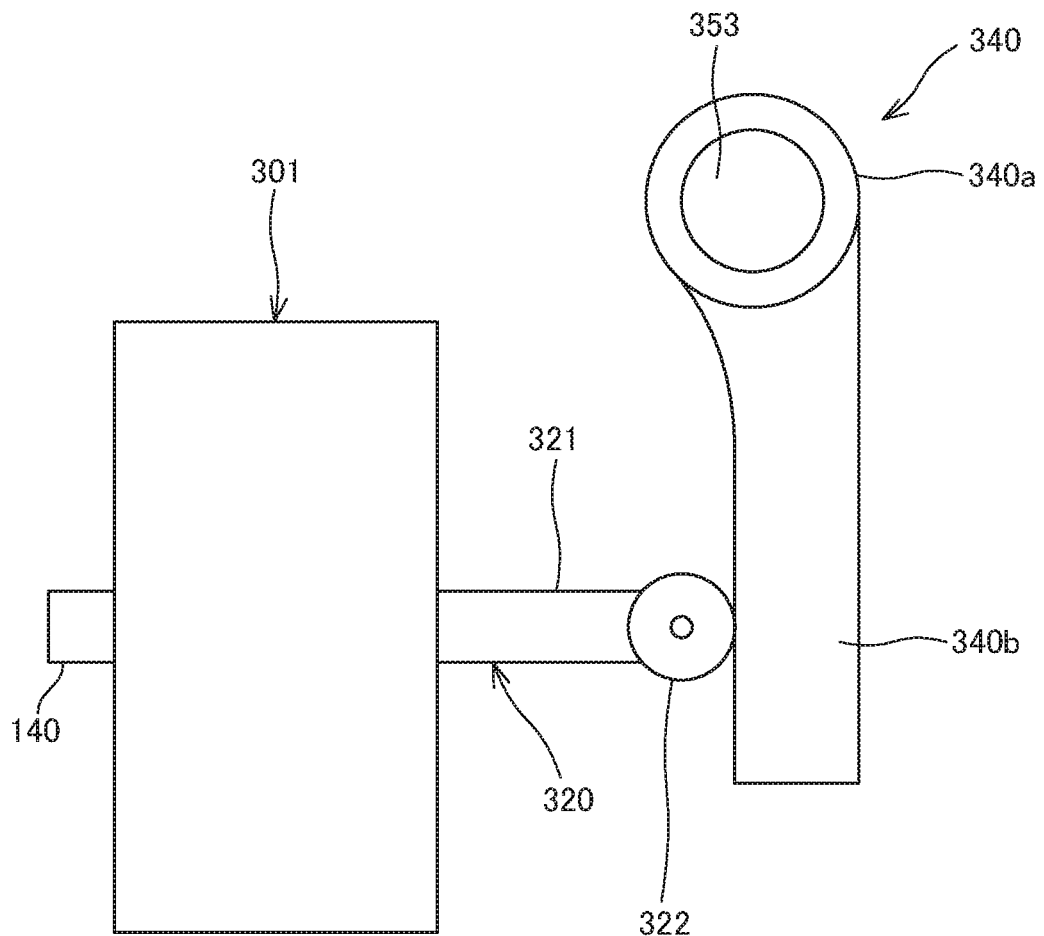
FIG. 11 is a view viewed in the direction of an arrow B of FIG. 10.

With the parking lever 340, as illustrated in FIG. 11, the one end portion 340a is fixed and coupled to the second eccentric part 353, and the other end portion 340b that is located at the position away from the one end portion 340a is provided to be pressed by the second piston 320. When the other end portion 340b of the parking lever 340 is pressed by the second piston 320, the parking lever 340 turns and the second eccentric part 353 is rotated via the parking lever 340. It should be noted that, in FIG. 11, illustrations of the structures other than those of the parking brake unit 301 and the parking lever 340 are omitted.

The second piston 320 has a column-shaped tip end part 321 to which a roller 322 is rotatably attached and the cylindrical part 122 (refer to FIG. 3) that has a cylindrical shape and that is formed continuously from the tip end part 321 along the axial direction. Similarly to the pressing part 121, the tip end part 321 protrudes from the through hole 102d of the first bottom part 102b to the outside of the housing 102.

When the first piston 110 moves in the second direction (left direction in FIG. 10), and the second piston 320 moves in the first direction (right direction in FIG. 10), the other end portion 340b of the parking lever 340 is pressed via the roller 322, and the parking lever 340 is turned. Thereby, the second eccentric part 353 of the eccentric cam 351 is rotated, the brake linings 2 are pressed against the wheel 1, and the brake device 300 is brought into the braking state.

As described above, with the parking brake unit 301, when the second piston 320 moves, the eccentric cam 351 rotates via the parking lever 340, not via the rod 21 of the actuator 20 and the levers 40. With the parking brake unit 301, the second piston 320 causes the eccentric cam 351 to rotate via the parking lever 340, and causes the brake linings 2 to move to the wheel 1 so as to bring the brake device 300 into the braking state.

At the time of releasing the braking of the brake, the compressed air is supplied into the pressure chamber 105, and the second piston 320 is pressed into the housing 102. When the braking releasing operation is made in this state by the driver, the eccentric cam 351 rotates in the direction in which the brake device 300 is brought into the non-braking state, and the brake linings 2 are separated from the brake disk 1a. Thus, the braking of the wheel 1 is released.

As described thus far, the parking brake unit 301 causes the brake device 300 to be in the braking state by rotating the eccentric cam 351 as the second piston 320 turns the parking lever 340 attached to the second eccentric part 353. As the second eccentric part 353 that extends toward the lower part of the brake device 300 is formed on the eccentric cam 351, it is possible to provide the parking brake unit 301 at the lower part of the brake device 300. This makes it possible to reduce the dead space in the vicinity of the brake device 300 and to achieve the space saving.

According to the above-described third embodiment, the parking lever 340 is turned and the eccentric cam 351 is rotated so as to bring the brake device 300 into the braking state. For this reason, a mounting position of the parking brake unit 301 can be decided freely, by adjusting a mounting position of the parking lever 340 and a mounting angle of the parking lever 340 with respect to the second eccentric part 353. Namely, the position of the parking brake unit 301 can be adjusted according to the space.

When, for example, installation space of the parking brake unit 301 can be secured, the second eccentric part 353 may be provided on the upper side of the eccentric cam 351, and the parking brake unit 301 may be provided at the upper part of the brake device 300. Further, by adjusting the mounting angle of the parking lever 340, for example, the parking brake unit 301 may be provided in such a manner that the advancing/retreating direction of the second piston 320 extends in the vertical direction in the drawing of FIG. 10.

According to the above-described third embodiment, the parking brake unit 301 presses the other end portion 340b of the parking lever 340, so as to turn the parking lever 340 and rotate the eccentric cam 351. Instead of this, the parking brake unit 301 may rotate the eccentric cam 351 by the second piston 320 moving and pulling other end portion 340b of the parking lever 340, as in the second embodiment. Namely, the above-described second embodiment and third embodiment may be combined.

The similar effects as those of the first embodiment can be obtained by the above-described third embodiment. Further, according to the third embodiment, the second piston 320 presses the parking lever 340 attached to the second eccentric part 353 of the eccentric cam 351 so that the parking brake unit 301 rotates the eccentric cam 351 via the parking lever 340. Even when the parking brake unit 301 is provided next to the actuator 20 of the brake device 300 in the axial direction, the brake device 300 can be brought into the braking state, thus improving freedom of the mounting position of the parking brake unit 301. Therefore, the parking brake unit 301 can be provided at the dead space under the brake device 300, and the space saving in the vicinity of the brake device 300 can be achieved.

Hereinafter, the structures, operations and effects of the embodiments of the present invention will be explained.

According to the first, second, and third embodiments, a parking brake unit 101, 201, 301 of a brake device 100, 200, 300 for braking a wheel 1 as a rod 21 serving as an output member of an actuator 20 presses a brake lining 2 against a brake disk 1*a* rotating with the wheel 1 by supply of compressed air, the parking brake unit 101, 201, 301 including a first piston 110, 210 formed in a cylindrical shape, the first piston 110, 210 having a first engaging part (first engaging groove 113) on an inner circumference thereof, the first piston 110, 210 configured to move in first direction by pressure of the compressed air supplied to a pressure chamber 105 defined in the back thereof, a biasing spring 118 configured to bias the first piston 110, 210 in second direction, opposite to the first direction, a second piston 120, 220, 320 slidably provided on the inner circumference of the first piston 110, 210, the second piston 120, 220, 320 having a second engaging part (second engaging groove 123) on an outer circumference thereof, and an engaging member 130 configured to cause the first engaging part (first engaging groove 113) and the second engaging part (second engaging groove 123) to engage with each other, in which the second piston 120, 220, 320 causes the brake lining 2 to move in direction bringing the wheel 1 to be in a braking state when the first piston 110, 210 moves in the second direction.

According to this structure, the first piston 110, 210 moves in the first direction by the pressure of the compressed air supplied to the pressure chamber 105, and moves in the second direction, opposite to the first direction, by the biasing force of the biasing spring 118. Therefore, when the compressed air inside the pressure chamber 105 is discharged, the first piston 110, 210 moves in the second direction by the biasing force of the biasing spring 118. Thereby, the second piston 120, 220, 320 that engages with the first piston 110, 210 via the engaging member 130 causes the brake lining 2 to move to the brake disk 1*a* in the direction bringing the wheel 1 to be in the braking state. Thus, the parking brake unit 101, 201, 301 that is applicable to the positive brakes can be provided.

According to the first, second, and third embodiments, the first engaging part is a first engaging groove 113 formed in an arc shape on the inner circumference of the first piston 110, 210, the second engaging part is a second engaging groove 123 formed in an arc shape at a circumferential position corresponding to the first engaging groove 113 on the outer circumference of the second piston 120, 220, 320, and the engaging member 130, having a circular cross section, is formed in an arc shape corresponding to the first engaging groove 113 and the second engaging groove 123.

According to this structure, the engaging member 130 is brought into line contact or surface contact with the first engaging groove 113 and the second engaging groove 123 by its circular arc. This makes it possible to efficiently transmit the power from the first piston 110, 210 to the second piston 120, 220, 320 and to improve durability due to the reduction in the surface pressure at the contact part.

According to the first, second, and third embodiments, a releasing rod 140 slidably provided on an inner circumference of the second piston 120, 220, 320, the releasing rod 140 having a third engaging groove 143 on an outer circumference thereof, is further provided. The second engaging groove 123 is formed to penetrate the second piston 120, 220, 320 in radial direction, and the engaging member 130 causes the second engaging groove 123 to engage with the third engaging groove 143 so that the engagement between the first engaging groove 113 and the second engaging groove 123 is released when releasing operation is made.

According to the first, second, and third embodiments, a biasing spring 128 configured to bias the releasing rod 140 against the second piston 120, 220, 320 in axial direction is further provided. When the releasing rod 140 is pressed into the second piston 120, 220, 320 against biasing force of the biasing spring 128, the engaging member 130 causes the second engaging groove 123 to engage with the third engaging groove 143 so that the engagement between the first engaging groove 113 and the second engaging groove 123 is released.

According to these structures, when the releasing rod 140 is pressed into the second piston 120, 220, 320 against the biasing force of the biasing spring 128, the engaging member 130 causes the second engaging groove 123 to engage with the third engaging groove 143 so that the engagement between the first engaging groove 113 and the second engaging groove 123 is released Thereby, the second piston 120, 220, 320 is able to slide in the axial direction relative to the first piston 110, 210. Thus, the wheel 1 can be switched from the braking state to the non-braking state by the operation of the actuator 20 of the brake device 100, 200, 300. Therefore, even when some trouble occurs in a pneumatic pressure circuit that supplies the compressed air, and the compressed air cannot be supplied to the pressure chamber 105, it is possible to switch the wheel 1 from the braking state to the non-braking state.

According to the first, second, and third embodiments, the brake device 100, 200, 300 includes a brake body 10 supported by a vehicle body or a truck, a pair of link arms 30 having support portions 32 between one end portions 31 and other end portions 33, the pair of link arms 30 being respectively provided to face both sides of the brake disk 1*a*, the support portions 32 being turnably supported relative to the brake body 10, the other end portions 33 supporting the brake lining 2, a coupling rod 35 coupling the one end portions 31 of the pair of link arms 30, a lever 40 turnably coupled to the rod 21 of the actuator 20, the lever 40 being configured to turn by advancing/retreating movement of the rod 21, and an eccentric cam 51, 351 having a rotation part 52 rotating around a rotation axis A1 by the turning of the lever 40, and an eccentric part 53 having a central axis A2 at a position offset from the rotation axis A1, the eccentric part 53 being configured to turn in an arc shape around the rotation axis A1 by the turning of the lever 40, the eccentric part being configured to expand/contract distance between the one end portions 31 of the pair of link arms 30, in which the eccentric cam 51, 351 rotates by advancing/retreating movement of the second piston 120, 220, 320.

According to this structure, the eccentric cam 51, 351 boosts the power, transmitted from the rod 21 via the lever 40, to be L1/L2 times greater, by a lever ratio between a distance L1, between both ends of the lever 40, and a distance L2 from the rotation axis A1 to the central axis A2 of the eccentric part 53, and transmits the power to the link arms 30. This makes it possible to obtain greater braking power without a large-sized actuator. Thus, reduction in size and weight of the brake device 100, 200, 300 is made possible.

According to the first, and second embodiments, when the first piston 110 moves in the second direction, the second piston 120 causes the rod 21 to move in the direction bringing the wheel 1 to be in the braking state.

According to the second embodiment, the parking brake unit 201 is provided to be opposed to the actuator 20 with the coupling rod 35 therebetween.

According to this structure, the actuator 20 and the parking brake unit 201 are provided with the coupling rod 35 therebetween, and thus the excellent weight balance can be achieved.

According to the third embodiment, the brake device 300 further includes a parking lever 340 coupled to the eccentric cam 351. The eccentric cam 351 further includes a second eccentric part 353 coupled to one end portion 340a of the parking lever 340, the second eccentric part 353 having a central axis at a position offset from the central axis A1 of the rotation part 52. When the first piston 110 moves in the second direction, the second piston 320 turns the parking lever 340 and rotates the eccentric cam 351 in the direction bringing the wheel 1 to be in the braking state.

According to this structure, the parking brake unit 301 can be provided next to the actuator 20 of the brake device 300 in the axial direction, thus improving the freedom of the mounting position of the parking brake unit 301. Therefore, the space saving in the vicinity of the brake device 300 can be achieved.

Embodiments of this invention were described above, but the above embodiments are merely examples of applications of this invention, and the technical scope of this invention is not limited to the specific constitutions of the above embodiments.

For example, the rod 21 of the actuator 20 and the levers 40 may be covered by a cover member (not illustrated) that is attached to the coupling rod 35. This makes it possible to protect the rod 21 and the levers 40 that are operated when the brake device 100, 200, 300 is actuated.

According to the above-described embodiments, the eccentric cam 51, 351 of the brake device 100, 200, 300 is rotated by the parking brake unit 101, 201, 301. Instead of this, an eccentric cam for the parking brake may be provided separately from the eccentric cam 51, 351 of the brake device 100, 200, 300.

Further, according to the above-described embodiments, the parking brake unit 101, 201, 301 is attached to the brake device 100, 200, 300. Instead of this, the parking brake unit 101, 201, 301 may be attached to the truck or the vehicle body, for example, and placed separately from the brake device 100, 200, 300. The rod 21 of the actuator 20 or the parking lever 340 may be actuated via a link (not illustrated).

This application claims priority based on Japanese Patent Application No. 2014-166044 filed with the Japan Patent Office on Aug. 18, 2014, the entire contents of which are incorporated into this specification.

The invention claimed is:

1. A parking brake unit of a brake device for braking a wheel as an output member of an actuator presses a brake lining against a brake disk rotating with the wheel by supply of hydraulic fluid, the parking brake unit comprising:
   a first piston formed in a cylindrical shape, the first piston having a first engaging part on an inner circumference thereof, the first piston being configured to move in first direction by pressure of the hydraulic fluid supplied to a pressure chamber defined in the back thereof;
   a first biasing member configured to bias the first piston in second direction, opposite to the first direction;
   a second piston slidably provided on the inner circumference of the first piston, the second piston having a second engaging part on an outer circumference thereof; and
   an engaging member configured to cause the first engaging part and the second engaging part to engage with each other,
   wherein the second piston causes the brake lining to move in direction bringing the wheel to be in a braking state, when the first piston moves in the second direction,
   wherein the first engaging part is a first engaging groove formed in an arc shape on the inner circumference of the first piston,
   wherein the second engaging part is a second engaging groove formed in an arc shape at a circumferential position corresponding to the first engaging groove on the outer circumference of the second piston, and
   wherein the engaging member, having a circular cross section, is formed in an arc shape corresponding to the first engaging groove and the second engaging groove.

2. The parking brake unit according to claim 1, further comprising
   a releasing member slidably provided on an inner circumference of the second piston, the releasing member having a third engaging part on an outer circumference thereof,
   wherein the second engaging part is formed to penetrate the second piston in radial direction,
   and wherein the engaging member causes the second engaging part to engage with the third engaging part so that the engagement between the first engaging part and the second engaging part is released, when releasing operation is made.

3. The parking brake unit according to claim 2, further comprising
   a second biasing member configured to bias the releasing member against the second piston in axial direction,
   wherein, when the releasing member is pressed into the second piston against biasing force of the second biasing member, the engaging member causes the second engaging part to engage with the third engaging part so that the engagement between the first engaging part and the second engaging part is released.

4. The parking brake unit according to claim 1, wherein the brake device comprises
   a brake body supported by a vehicle body or a truck,
   a pair of link arms having support portions between first end portions and second end portions, the pair of the link arms being respectively provided to face both sides of the brake disk, the support portions being turnably supported relative to the brake body, the second end portions supporting the brake lining,
   a coupling member coupling the first end portions of the pair of link arms,
   a lever turnably coupled to the output member of the actuator, the lever being configured to turn by advancing and retreating movement of the output member, and
   an eccentric cam having a rotation part rotating around a rotation axis by the turning of the lever, and an eccentric part having a central axis at a position offset from the rotation axis, the eccentric part being configured to turn in an arc shape around the rotation axis by the turning of the lever, the eccentric part being configured to expand and contract distance between the first end portions of the pair of link arms, wherein the eccentric cam rotates by advancing and retreating movement of the second piston.

5. The parking brake unit according to claim 4, wherein, when the first piston moves in the second direction, the second piston causes the output member to move in the direction bringing the wheel to be in the braking state.

6. The parking brake unit according to claim 5, wherein the parking brake unit is provided to be opposed to the actuator with the coupling member therebetween.

7. The parking brake unit according to claim 4, wherein the brake device further comprises a parking lever coupled to the eccentric cam, wherein the eccentric cam further comprises a second eccentric part coupled to one end portion of the parking lever, the second eccentric part having a central axis at a position offset from the central axis of the rotation part, and wherein, when the first piston moves in the second direction, the second piston turns the parking lever and rotates the eccentric cam in the direction bringing the wheel to be in the braking state.

8. The parking brake unit according to claim 2, wherein the brake device comprises a brake body supported by a vehicle body or a truck, a pair of link arms having support portions between first end portions and second end portions, the pair of the link arms being respectively provided to face both sides of the brake disk, the support portions being turnably supported relative to the brake body, the second end portions supporting the brake lining, a coupling member coupling the first end portions of the pair of link arms, a lever turnably coupled to the output member of the actuator, the lever being configured to turn by advancing and retreating movement of the output member, and an eccentric cam having a rotation part rotating around a rotation axis by the turning of the lever, and an eccentric part having a central axis at a position offset from the rotation axis, the eccentric part being configured to turn in an arc shape around the rotation axis by the turning of the lever, the eccentric part being configured to expand and contract distance between the first end portions of the pair of link arms, wherein the eccentric cam rotates by advancing and retreating movement of the second piston.

9. The parking brake unit according to claim 3, wherein the brake device comprises a brake body supported by a vehicle body or a truck, a pair of link arms having support portions between first end portions and second end portions, the pair of the link arms being respectively provided to face both sides of the brake disk, the support portions being turnably supported relative to the brake body, the second end portions supporting the brake lining, a coupling member coupling the first end portions of the pair of link arms, a lever turnably coupled to the output member of the actuator, the lever being configured to turn by advancing and retreating movement of the output member, and an eccentric cam having a rotation part rotating around a rotation axis by the turning of the lever, and an eccentric part having a central axis at a position offset from the rotation axis, the eccentric part being configured to turn in an arc shape around the rotation axis by the turning of the lever, the eccentric part being configured to expand and contract distance between the first end portions of the pair of link arms, wherein the eccentric cam rotates by advancing and retreating movement of the second piston.

\* \* \* \* \*